United States Patent [19]

Uhlianuk

[11] Patent Number: 5,371,120
[45] Date of Patent: Dec. 6, 1994

[54] CROSSLINKED MICROGEL FOR CATHODIC ELECTROCOATING COMPOSITIONS

[75] Inventor: Peter W. Uhlianuk, Romeo, Mich.

[73] Assignee: E. I. Du Pont de Nemours and Company, Wilmington, Del.

[21] Appl. No.: 93,030

[22] Filed: Jul. 19, 1993

[51] Int. Cl.⁵ .................... C08K 3/20; C08L 63/02
[52] U.S. Cl. ............................ 523/414; 523/415; 204/181.4
[58] Field of Search .................. 523/414, 415; 204/181.4

[56] References Cited

U.S. PATENT DOCUMENTS

| | | | |
|---|---|---|---|
| 3,922,253 | 11/1975 | Jerabek et al. | 260/77.5 TB |
| 3,976,615 | 8/1976 | Sekmakas | 260/29.6 HN |
| 4,046,729 | 9/1977 | Scriven et al. | 260/29.2 TN |
| 4,129,490 | 12/1978 | Schimmel | 204/181 C |
| 4,137,140 | 1/1979 | Belanger | 204/181 C |
| 4,148,772 | 4/1979 | Marchetti et al. | 260/29.2 EP |
| 4,148,950 | 4/1979 | Brindell et al. | 427/421 |
| 4,170,579 | 10/1979 | Bosso | 260/29.2 TN |
| 4,172,062 | 10/1979 | Sekmakas | 260/29.3 |
| 4,419,467 | 12/1983 | Wismer et al. | 523/414 |
| 4,468,307 | 8/1984 | Wismer et al. | 204/181 C |
| 4,525,260 | 6/1985 | Abbey et al. | 204/181.7 |
| 4,557,814 | 12/1985 | Schupp et al. | 204/181.7 |
| 4,678,835 | 7/1987 | Chang et al. | 525/100 |
| 4,788,246 | 11/1988 | Tsuchiya et al. | 524/554 |
| 4,883,572 | 11/1989 | Rao et al. | 204/181 F |
| 4,883,830 | 11/1989 | Kitabatake et al. | 523/414 |
| 4,968,399 | 11/1990 | Tsuchiya et al. | 204/181.1 |
| 4,981,884 | 1/1991 | Perner et al. | 523/404 |
| 4,987,178 | 1/1991 | Shibata et al. | 524/547 |
| 5,015,672 | 5/1991 | Perner et al. | 523/415 |
| 5,070,120 | 12/1991 | Sakamoto et al. | 523/412 |
| 5,070,149 | 12/1991 | DeBroy et al. | 525/296 |
| 5,075,165 | 12/1991 | Kishi et al. | 428/331 |
| 5,096,556 | 3/1992 | Corrigan et al. | 204/181.7 |
| 5,130,402 | 7/1992 | Akiyama et al. | 528/45 |
| 5,132,180 | 7/1992 | Kishi et al. | 428/457 |
| 5,135,970 | 8/1992 | Honel et al. | 523/414 |
| 5,171,764 | 12/1992 | Katayama et al. | 523/201 |

FOREIGN PATENT DOCUMENTS

| | | |
|---|---|---|
| 1315475-A | 12/1989 | Japan . |
| 2045518-A | 2/1990 | Japan . |
| 2276876-A | 11/1990 | Japan . |
| 3028278-A | 2/1991 | Japan . |
| 3174432-A | 7/1991 | Japan . |

OTHER PUBLICATIONS

Lee-Neville, Handbook of Epoxy Resins, 1967, pp. 2-2, 2-6 and 2-7.

*Primary Examiner*—Melvyn I. Marquis
*Assistant Examiner*—D. Aylward
*Attorney, Agent, or Firm*—Hilmar L. Fricke

[57] ABSTRACT

A cationic finely divided polymeric microgel dispersed in an aqueous medium for use in cationic electrocoating compositions containing a poly epoxy hydroxy ether resin having terminal epoxy groups and having about 20-60% of the terminal epoxy groups reacted with ketimine or oxazolidine, 10-60% of the terminal epoxy groups reacted with a primary or secondary amine or mixtures thereof to form hydroxy and amine groups and 10-40% of the terminal epoxy groups are unreacted; wherein the terminal epoxy groups are reacted with amine groups thereby forming a crosslinked microgel and residual amine groups are neutralized with acid to form cationic groups thereby forming a water dispersible microgel.

10 Claims, No Drawings

CROSSLINKED MICROGEL FOR CATHODIC ELECTROCOATING COMPOSITIONS

BACKGROUND OF THE INVENTION

This invention is directed to microgels and in particular to microgels that are useful in cathodic electrocoating compositions.

The coating of electrically conductive substrates by an electrodeposition process (also called an electrocoating process) is a well known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a coating having the desired thickness is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form an electrocoating bath. The electrocoating bath is placed in an insulated tank containing the anode. The article to be coated is the cathode and is passed through the tank containing the electrocoating bath. The thickness of the coating that is deposited on the particle being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions, resin compositions, coating baths, and cathodic electrodeposition processes are disclosed in Jerabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979, Wismer et al U.S. Pat. No. 4,468,307 issued Aug. 25,1984 and DebRoy et al U.S. Pat. No. 5,070,149 issued Dec. 3, 1991.

The use of cationic microgels in cathodic electrocoating compositions is known to solve problems of improving edge coverage and reducing edge corrosion as shown in Abbey et al U.S. Pat. No. 4,525,260 issued Jun. 25, 1985, Tsuchiya et al U.S. Pat. No. 4,788,246 issued Nov. 29, 1988, Shibata et al U.S. Pat. No. 4,987,178 issued Jan. 22, 1991 and Corrigan et al U.S. Pat. No. 5,096,556 issued Mar. 17, 1992.

However, Abbey et al and Shibata et al are both directed to acrylic polymer based microgels and Tsuchiya et al is directed to a polybutadiene based microgel. Microgels based on acrylic polymers or butadiene polymers adversely affect the general corrosion protection of coatings formed from cathodic electrocoating compositions. The microgel of this invention is based on an epoxyhydroxy polyether resin and does not reduce the general corrosion protection of coatings formed from cathodic electrocoating compositions and forms electrocoating composition having improved throwing power in comparison to the composition of the prior art. Corrigan et al forms microgels based on epoxy resins but uses a different and less efficient synthesis for forming microgels and forms microgels having a different chemical structure from those of the invention.

SUMMARY OF THE INVENTION

A cationic finely divided polymeric microgel dispersed in an aqueous medium for use in cationic electrocoating compositions containing a poly epoxy hydroxy ether resin having terminal epoxy groups and having about 20–60% of the terminal epoxy groups reacted with ketimine or oxazolidine and are subsequently reacted with water to form amine groups, 10–60% of the terminal epoxy groups are reacted with a primary or secondary amine or mixtures thereof to form hydroxy and amine groups and 10–40% of the terminal epoxy groups are unreacted; wherein the terminal epoxy groups are reacted with amine groups thereby forming a crosslinked microgel and residual amine groups are neutralized with acid to form cationic groups thereby forming a water dispersible microgel.

A process for forming the microgel and cationic electrocoating compositions containing the microgel also are a part of this invention.

DETAILED DESCRIPTION OF THE INVENTION

The microgel of this invention when added to a conventional electrocoating composition improves the edge corrosion of the electrocoating composition, provides thicker edge coverage and improved throwing power in comparison to conventional electrocoating compositions that do not contain microgel. The microgel does not adversely affect other properties of the electrocoating composition such as its overall corrosion protection. The microgel can be added directly to an electrocoating tank containing an epoxy based composition and need not be formulated with the coating composition. The microgel usually is added to the electrocoating composition in amounts of about 0.1–20% by weight, based on the weight of the binder of the coating composition to achieve these improved results.

The microgel is prepared by reacting about 20–60% of the terminal epoxy groups of an epoxy terminated polyepoxy hydroxy ether resin with a kerimine or an oxazolidine; about 10–60% of the terminal epoxy groups are reacted with a primary or secondary amine or mixtures thereof to form hydroxy and amine groups; the residual 10–40% of the terminal epoxy groups are unreacted. The reaction of the epoxy groups is carried out at about 80°–110° C. for about 15–60 minutes. Preferably, about 45–55% of the epoxy groups are reacted with kerimine or oxazolidine and 20–30% are reacted with amine and 20–30% of the epoxy groups are unreacted. The amine groups groups are neutralized with an acid to form cationic groups that are water dispersible. The reaction product of epoxy and ketimine or oxazolidine reacts with water to form amine groups which react with the unreacted epoxy groups to form a crosslinked polymeric microgel. These amine groups may also react with any acid that may be present to form water dispersible cationic groups. The resulting polymeric crosslinked microgel is dispersed in water and forms an emulsion.

The epoxy terminated polyepoxy hydroxy ether resins used to form the microgel have a 1,2-epoxy equivalency of about two or more, that is, polyepoxides which have on an average basis two or more epoxy groups per molecule. The preferred polyepoxides are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)ethane; 2-methyl-1,1-bis-(4hydroxyphenyl) propane; 2,2-bis-(4-hydroxy-3-tertiarybutylphenyl)propane; 1,1-bis-(4-hydroxyphenol)ethane; bis-(2-hydroxynaphthyl)methane; 1,5-dihydroxy-3-naphthalene or the like.

Besides polyhydric phenols, other cyclic polyols can be used in preparing the polyglycidyl ethers of cyclic polyol derivatives. Examples of other cyclic polyols are alicyclic polyols, particularly cycloaliphatic polyols, such as 1,2-bis(hydroxymethyl)cyclohexane; 1,3-bis (hydroxymethyl)cyclohexane; 1,2 cyclohexane diol; 1,4 cyclohexane diol and hydrogenated bisphenol A.

The polyepoxides have molecular weights of at least 200 and preferably within the range of 200 to 3000, and more preferably about 340 to 2000.

The polyepoxides can be chain extended with a polyether or a polyester polyol which enhances flow and coalescence. Typical useful chain extenders are polyols such as polycaprolactone diols such as Tone ® series available from Union Carbide Corporation, polyoxypropylene diamine such as Jeffamine D-2000 ® having a molecular weight of about 2000 available from Texaco Chemical Company and ethyoxylated Bisphenol A such as SYNFAC 8009 ® available from Milliken Chemical Company.

Examples of polyether polyols and conditions for chain extension are disclosed in U.S. Pat. No. 4,468,307. Examples of polyester polyols for chain extension are disclosed in Marchetti et al U.S. Pat. No. 4,148,772 issued Apr. 10, 1979.

Ketimines useful in this invention are formed from ketones and primary amines. The water formed is removed, for example, by azeotropic distillation. Useful ketones include dialkyl, diaryl and alkylaryl ketones having 3-13 carbons atoms. Specific examples include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable diamines are ethylene diamine, 1,3-diamopropane, 1,4-diaminobutane, 1,6-diaminohexane, 4,9dioxadodecone, 1,12-diamine and the like. One typically useful ketimine is diketimine which is the ketimine of diethylene triamine and methyl isobutyl ketone.

Typically useful primary and secondary amines are diethyl amine, methyl ethyl amine, methyl ethanol amine, ethyl ethanol amine, mono ethanol amine, ethyl amine, dimethyl amine, diethyl amine, propyl amine, dipropyl amine, isopropyl amine, diisopropyl amine, butyl amine, dibutyl amine and the like. Alkanol amines such as methyl ethanol amine are preferred.

Typical acids used to neutralize the hydroxy and amine groups of the resin to form cationic groups which are water dispersible are lactic acid, acetic acid, formic acid and sulfamic acid.

When the resin is inverted into water containing acid, the reaction product of the epoxy group of the polyepoxy hydroxy ether resin and ketimine or oxazolidine form amine groups which react with the unreacted epoxy groups of the polyepoxy hydroxy ether resin as do the other amine groups of the resin to form a crosslinked microgel. The acid reacts with the amine groups to form cationic groups and a stable dispersion of microgel particles is formed. The microgel particles have a particle size of about 0.01 to 6 microns determined by a Coulter Model LS150 Automated Laser Based Particle Size Analyzer made by Coulter Scientific Instruments.

A surfactant may be used in an amount of up to 5% by weight of the microgel in the composition to keep the particles dispersed. Typically useful surfactants are described hereinafter.

The microgel is designed for use in aqueous cathodic electrocoating compositions but could be used in other waterbased coating compositions such as aqueous latexes and enamels.

Typical aqueous cationic electrocoating compositions are shown in DebRoy et al U.S. Pat. No. 5,070,149 issued Dec. 3, 1991 and the aforementioned U.S. Pat. Nos. 3,922,253, 4,419,467, 4,137,140 and 4,468,307.

These cationic electrocoating compositions typically contain a cationic resinous binder of an epoxy/amine adduct and a blocked isocyanate crosslinking agent dispersed in an aqueous medium and the binder is present in amounts of about 50-75% by weight of solids.

Besides the ingredients described above, the electrocoating composition usually contains a pigment which is incorporated into the composition in the form of a paste. The pigment paste is prepared by grinding or dispersing a pigment into a grinding vehicle and optional ingredients such as wetting agents, surfactants, and defoamers. Pigment grinding vehicles are well known in the art. After grinding, the particle size of the pigment should be as small as practical, generally, a Hegman grinding gauge of about 6 to 8 is usually employed.

Pigments which can be employed in the practice of the invention include titanium dioxide, basic lead silicate, strontium chromate, carbon black, iron oxide, clay and the like. Pigments with high surface areas and oil absorbencies should be used judiciously because they can have an undesirable effect on coalescence and flow.

The pigment-to-resin weight ratio is also important and should be preferably less than 50:100, more preferably less than 40:100, and usually about 20 to 40:100. Higher pigment-to-resin solids weight ratios also have been found to adversely affect coalescence and flow.

The electrocoating compositions of the invention can contain optional ingredients such as wetting agents, surfactants, defoamers and the like. Examples of surfactants and wetting agents include alkyl imidazolines such as those available from Ciba-Geigy Industrial Chemicals as Amine C ®, acetylenic alcohols available from Air Products and Chemicals as Surfynol 104 ®. These optional ingredients, when present, constitute from about 0 to 20 percent by weight of resin solids. Plasticizers promoting flow are optional ingredients. Examples of plasticizers are high boiling water immiscible materials such as ethylene or propylene oxide adducts of nonyl phenols or bisphenol A. Plasticizers can be used at levels of up to about 15 percent by weight resin solids.

Curing catalysts such as tin catalysts are usually present in the composition. Examples are dibutyltin dilaurate and dibutyltin oxide. When used, they are typically present in amounts of about 0.05 to 2 percent by weight tin, based on weight of total resin solids.

The electrocoating compositions of this invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

In the electrocoating process, a film is electrodeposited on a metal substrate using a voltage of about 50 to 500 volts and the resulting film is baked at about 120° to 250° C. for about 10 to 60 minutes to form a film about 15 to 60 microns in thickness.

The following examples illustrate the invention. All parts and percentages are on a weight basis unless otherwise specified.

EXAMPLES

Example 1

A microgel was prepared by charging the following constituents into a reactor equipped with a reflux condenser, heat source, a stirrer and a thermometer:

|  | Parts by Weight |
|---|---|
| Portion 1 | |
| Epon 828 ®-epoxy resin of diglycidyl ether of Bisphenol A from Shell Chemical Company having an equivalent weight of 188 | 550.0 |
| Bisphenol A | 194.0 |
| Xylene | 34.9 |
| n,n'-Dimethyl benzyl amine | 0.8 |
| Portion 2 | |
| Methyl isobutyl ketone | 151.1 |
| Portion 3 | |
| Methylethanol amine | 22.9 |
| Diketimine | 223.6 |
| Portion 4 | |
| Lactic acid | 31.1 |
| Surfactant - 120 parts Amine C ® from Ciba Geigy Inc., 120 parts acetylenic alcoholic available as Surfynol 104 ® from Air Products and Chemicals, Inc., 120 parts of 1-butoxy ethanol, 221 parts of | 8.7 |

-continued

|  | Parts by Weight |
|---|---|
| deionized water and 19 parts glacial acetic acid | |
| Deionized water | 1709.0 |
| Total | 2926.1 |

Portion 1 was charged into the reaction vessel heated to about 146° C. under a blanket of nitrogen with constant stirring to extend the epoxy resin to a weight per expoxide of 609.8. Portion 2 was added and then Portion 3 was added. The reaction mixture was held at about 104° C. for about 30 minutes. Portion 4 was charged into a separate vessel and mixed. The above reaction mixture was added to Portion 4 with mixing and mixing was continued for 4 hours.

The resulting microgel emulsion had a solids content of about 16.9%. The particle size of the emulsion was determined as described above and was about 2 microns. The microgel had about 34% of the amine functionality neutralized with acid about 25% of the epoxy end groups reacted with methyl ethanol amine and about 50% of the end groups reacted with diketimine and about 25% of the epoxy groups unreacted before the addition of Portion 4. On the addition of Portion 4, the unreacted epoxy groups reacted with the amine groups and with the amine groups resulting from the reaction of the ketimine with water in the addition of Portion 4 to form crosslinked microgel particles and the lactic acid reacted with amine to form water dispersible cationic groups. The percent of insoluble microgel was determined by solvent extraction techniques and was about 75.3%.

Example 2

The following constituents were charged into a reaction vessel equipped with a reflux condenser, a heat source, thermometer and a stirrer:

|  | Parts by Weight |
|---|---|
| Portion 1 | |
| Bisphenol A | 194.0 |
| Epon 828 ®-described in Example 1 | 550.0 |
| Xylene | 34.9 |
| n,n'-Dimethyl benzyl amine | 1.0 |
| Portion 2 | |
| Methyl isobutyl ketone | 151.0 |
| Portion 3 | |
| Methyl ethanol amine | 45.8 |
| Oxazolidine (QM-1007 from Rohm & Haas) | 120.9 |
| Portion 4 | |
| Deionized water | 5.4 |
| Portion 5 | |
| Lactic acid | 61.7 |
| Surfactant - described in Example 1 | 12.5 |
| Deionized water | 3000.0 |
| Total | 4177.2 |

Portion 1 was charged into the reaction vessel heated to about 146° C. under a blanket of nitrogen with constant stirring to extend the epoxy resin to a weight per epoxide of 639.2. Portion 2 was added and then Portion 3 was added and the reaction mixture was held at about 93° C. for about 45 minutes. Portion .4 was added to the reaction mixture. Portion 5 was charged into a separate vessel and mixed. The above reaction mixture was added with mixing to Portion 5 and held for about 6 hours.

The resulting microgel emulsion had a solids content of about 21.4%. The particle size of the emulsion was determined as described above and was about 0.3 microns. The microgel had about 50% of the amine functionality neutralized with acid and about 50% of the epoxy end groups reacted with methyl ethanol amine, about 25% of the end groups reacted with oxazolidine and about 25% of the epoxy groups were unreacted until Portion 5 was added. Upon the addition of Portion 5, the epoxy groups reacted with the amine groups formed by the reaction of oxazolidine with water and with the other amine groups present to form crosslinked microgel particles. The lactic acid reacted with amine to form water dispersible cationic groups. The percent of insoluble microgel was determined by solvent extraction techniques and was about 84.2%.

Example 3

An electrocoating composition was prepared according to Example 1 of U.S. Pat. No. 5,070,149 and then the following electrocoating baths 1–7 were formulated with the with each of the microgels prepared in Examples 1 and 2:

| Elecrocoating Bath | % Microgel | Corrosion Test - Number of Rust Spots |
| --- | --- | --- |
| Bath No. 1 | Control (0% Microgel) | 125 |
| Bath No. 2 | 3% Microgel (Ex. 1) | 81 |
| Bath No. 3 | 6.6% Microgel (Ex. 1) | 11 |
| Bath No. 4 | 9.9% Microgel (Ex. 1) | 0 |
| Bath No. 5 | 3% Microgel (Ex. 2) | 57 |
| Bath No. 6 | 6.6% Microgel (Ex. 2) | 22 |
| Bath No. 7 | 9.9% Microgel (Ex. 2) | 0 |

In the corrosion test used above, three separate sets of razor blades (10×2 cm with 38° blade angle) were electrocoated at 230 volts in each bath and the coating was baked at about 182° C. for 17 minutes to provide a coating having a dry film thickness of 0.8 mils (20.3 microns). Each of the razor blades was exposed five days to a standard salt spry test and the rust spots on each of the blades was counted and averaged for each set of three blades and the results are set forth above in the table.

The test results showed that there was a significant improvement in corrosion resistance for each bath containing the microgel in comparison to the control that did not contain microgel. In each case, the higher the amount of microgel a better the level corrosion resistance was noted.

We claim:

1. A cationic finely divided polymeric microgel dispersed in an aqueous medium for use in cationic electrocoating compositions consisting essentially of a poly epoxy hydroxy ether resin having hydroxy groups and terminal epoxy groups and having about 20–60% of the terminal epoxy groups reacted with kerimine or oxazolidine and subsequently being reacted with water to form amine groups, 10–60% of the terminal epoxy groups reacted with a primary or secondary amine or mixtures thereof thereby forming hydroxy and amine groups and 10–40% of the terminal epoxy groups being unreacted; wherein said terminal epoxy groups being reacted with amine groups thereby forming a crosslinked microgel and residual amine groups being neutralized with acid to form cationic groups thereby forming a water dispersible microgel.

2. The microgel of claim 1 in which the ketimine is a diketimine, the amine is an alkanol amine and the acid is an organic acid.

3. The microgel of claim 2 in which the poly epoxy hydroxy ether resin is a diglycidyl ether of a polyphenol extended with a polyol.

4. The microgel of claim 3 in which about 45–55% of the glycidyl groups of the resin are reacted with a ketimine or oxazolidine, 20–30% of the glycidyl groups are reacted with a primary amine, a secondary amine or mixtures thereof and about 20–30% of the glycidyl groups being unreacted.

5. The microgel of claim 4 in which 45–55% of the glycidyl groups are reacted with oxazolidine, the amine is an alkanol amine and the acid is an organic acid.

6. An aqueous cationic electrocoating composition having a film forming binder of a basic polyepoxide/amine adduct resin containing amino groups and hydroxyl groups capable of reaction with isocyanate groups and a blocked polyisocyanate crosslinking agent containing about 0.1–20% by weight, based on the weight of the binder, of the microgel of claim 1.

7. A process for forming a stable aqueous dispersion of a crosslinked microgel which comprises the following steps:
(1) reacting a poly epoxy hydroxy ether resin having terminal epoxy groups with a ketimine or oxazolidine to react 20–60% of the terminal epoxy groups of the resin;
(2) reacting the poly epoxy hydroxy ether resin with a primary or secondary amine or mixture thereof to react about 10–60% of the terminal epoxy groups of the resin thereby forming hydroxy and amine groups and leaving about 10–40% of the terminal epoxy groups unreacted;
(3) neutralizing amine groups of the resin with an organic acid in water to form cationic groups for water dispersibility and reacting the product formed in step (1) of the ketimine or oxazolidine and terminal epoxy groups with water to form amine groups and reacting the amine groups of the resin with the unreacted terminal epoxy groups of the resin to form a crosslinked microgel in an aqueous dispersion.

8. The process of claim 7 in which the poly epoxy hydroxy ether resin is a diglycidyl ether of a polyphenol chain extended with a polyol and the ketimine is a diketimine, the amine is an alkanol amine and the acid is an organic acid.

9. The process of claim 7 in which the poly epoxy hydroxy ether resin is a digylcidyl ether of a polyphenol chain extended with a polyol and is reacted with an oxazolidine in step (1), the amine is an alkanol amine and the acid is an organic acid.

10. The process of claim 7 in which about 45–55% of the the glycidyl groups of the resin are reacted with a ketimine or oxazolidine, 20–30% of the glycidyl groups are reacted with a primary amine, a secondary amine or mixtures thereof and about 20–30% of the glycidyl groups being unreacted.

* * * * *